(12) United States Patent
Park et al.

(10) Patent No.: US 12,667,117 B2
(45) Date of Patent: Jun. 30, 2026

(54) CONE-SHAPED EDIBLE CONTAINER AND MANUFACTURING METHOD THEREOF

(71) Applicant: CJ CHEILJEDANG CORPORATION, Jung-gu (KR)

(72) Inventors: Eun Sun Park, Songpa-gu (KR); Ho Min Myung, Dongdaemun-gu (KR); Seung Eun Park, Songpa-gu (KR); Na Ri Shin, Guro-gu (KR); Da Woon Jeong, Songpa-gu (KR)

(73) Assignee: CJ CHEILJEDANG CORPORATION, Jung-gu (KR)

( * ) Notice: Subject to any disclaimer, the term of this patent is extended or adjusted under 35 U.S.C. 154(b) by 502 days.

(21) Appl. No.: 17/294,100

(22) PCT Filed: Aug. 29, 2019

(86) PCT No.: PCT/KR2019/011082
§ 371 (c)(1),
(2) Date: May 14, 2021

(87) PCT Pub. No.: WO2020/101158
PCT Pub. Date: May 22, 2020

(65) Prior Publication Data
US 2022/0007675 A1 Jan. 13, 2022

(30) Foreign Application Priority Data
Nov. 16, 2018 (KR) ........................ 10-2018-0142042

(51) Int. Cl.
*B65D 3/06* (2006.01)
*A23G 9/50* (2006.01)
(Continued)

(52) U.S. Cl.
CPC ............... *A23G 9/506* (2013.01); *B65D 3/06* (2013.01); *B65D 65/463* (2013.01); *B65D 85/78* (2013.01)

(58) Field of Classification Search
None
See application file for complete search history.

(56) References Cited

U.S. PATENT DOCUMENTS

| | | | |
|---|---|---|---|
| 2010/0297314 A1 | 11/2010 | Bogal | |
| 2014/0170291 A1* | 6/2014 | Chung | A23L 7/13 426/560 |
| 2019/0110485 A1* | 4/2019 | Harada | A21D 15/02 |

FOREIGN PATENT DOCUMENTS

| | | | |
|---|---|---|---|
| JP | H04222545 A | | 8/1992 |
| JP | H04103496 U | * | 9/1992 |

(Continued)

OTHER PUBLICATIONS

Youtube—How to Make a Cone, Oct. 12, 2009 <http://www.youtube.com/watch?v=4AyjO1v2dTQ> (Year: 2009).*
(Continued)

*Primary Examiner* — Viren A Thakur
(74) *Attorney, Agent, or Firm* — Merchant & Gould P.C.

(57) ABSTRACT

A cone-shaped edible container according to the present invention comprises: an edible outer layer; an edible inner layer; a first edible adhesive layer disposed between the outer layer and the inner layer to bond the outer layer and the inner layer together; and a second adhesive layer for maintaining the outer layer and the inner layer to be in the shape of a cone, wherein at least some regions of the edible container have a first cross-section structure in which the inner layer, the first adhesive layer, and the outer layer are sequentially laminated in a direction from the inside toward the outside, and have a second cross-section structure in which the inner layer, the first adhesive layer, the outer layer, (Continued)

the second adhesive layer, the inner layer, the first adhesive layer, and the outer layer are sequentially laminated in the direction from the inside toward the outside.

15 Claims, 14 Drawing Sheets

(51) Int. Cl.
    *B65D 65/46*          (2006.01)
    *B65D 85/78*          (2006.01)

(56)                    References Cited

FOREIGN PATENT DOCUMENTS

| | | | | |
|---|---|---|---|---|
| JP | 05-015784 | U | | 3/1993 |
| JP | H05130828 | A | | 5/1993 |
| JP | 2004049216 | A | * | 2/2004 |
| JP | 2011177168 | A | * | 9/2011 |
| JP | 6472111 | B2 | | 2/2019 |
| KR | 890001820 | B1 | * | 5/1989 |
| KR | 200419585 | Y1 | * | 6/2006 |
| KR | 100740204 | B1 | * | 7/2007 |
| KR | 2008016402 | A | * | 2/2008 |
| KR | 10-1302159 | B1 | | 8/2013 |
| KR | 101747914 | B1 | * | 6/2017 |
| KR | 10-2017-0109937 | A | | 10/2017 |
| KR | 10-2018-0007268 | A | | 1/2018 |
| KR | 20180001228 | U | * | 5/2018 |
| KR | 10-2042250 | B1 | | 11/2019 |
| WO | WO-2007147565 | A1 | * | 12/2007 ............. A21B 5/026 |

OTHER PUBLICATIONS

"Seasoned Advice" Oct. 15, 2013 <https://cooking.stackexchange.com/questions/37478/sushi-rolls-opening-up> (Year: 2013).*
"Rice-Free Sushi" Oct. 2015 <web.archive.org/web/20151026014417/https://www.primalpalate.com/paleo-blog/rice-free-sushi/> (Year: 2015).*
"Frugal Nutrition" Jun. 12, 2015 <https://www.frugalnutrition.com/salmon-avocado-seaweed-rolls-onigiri-rolls/> (Year: 2015).*
Korean Notice of Allowance for KR Application No. 10-2019-0138864 mailed Mar. 31, 2022 (7 pages, with English translation).
International Search Report issued in corresponding International Patent Application No. PCT/KR2019/011082, mailed Dec. 20, 2019, 7 pages with English translation.
Office Action issued in corresponding Korean Patent Application No. 10-2019-0138864, mailed Sep. 28, 2021, 6 pages (with English Translation).
Author Unknown, Online articles about bibi-cone, with English summary, 2018, 309 pages.

* cited by examiner

CONE-SHAPED EDIBLE CONTAINER AND MANUFACTURING METHOD THEREOF

This application is a National Stage Application of PCT/KR2019/011082, filed 29 Aug. 2019, which claims benefit of Serial No. 10-2018-0142042, filed 16 Nov. 2018 in Republic of Korea and which application(s) are incorporated herein by reference. To the extent appropriate, a claim of priority is made to each of the above disclosed applications.

TECHNICAL FIELD

The present disclosure relates to a conical edible container and a method for manufacturing the same, and more particularly, to a conical edible container including an outer shell, an inner shell, and an adhesive layer, and a method for manufacturing the same.

BACKGROUND ART

Modern people take various instant foods to save time in busy everyday lives.

In particular, Korean people who mainly eat rice prefer instant foods using fried rice most, but unlike hamburgers or hotdogs, instant foods using fried rice that are packaged in a form that may be conveniently taken while the users are not seated have not been provided.

This is because it is difficult to carry fried rice due to hot heat and the fried rice is fragile when it is heated by using a microwave range provided in a convenient store or the like.

Fried rice that is frozen and processed in a plastic container or a paper container is packaged to make the fried rice preferred by Korean people in the instant form, but the plastic container or the paper container has to be treated after the fried rice is taken, and because the plastic container or the paper container has to have a size that is large enough to house fried rice to container the fried rice, a paper container of a large size is necessary.

In consideration of the problem, it also may be considered to allow the container to simply house contents and make the container itself edible. Through this, the consumers may be provided with interests, the tastes of the consumers may be stimulated, and the convenience of separately treating the container after the foods are taken may be reduced.

However, to achieve this, a technology of providing an edible container having a suitable strength is necessary.

DISCLOSURE

Technical Problem

A main objective of the present disclosure is to provide an edible container provided with an interior space that may house contents, and to provide a conical edible container that has a suitable strength such that the structure thereof may be maintained.

The objectives of the present disclosure are not limited thereto, and other unmentioned effects of the present invention may be clearly appreciated by those skilled in the art from the following descriptions.

Technical Solution

In order to solve the problems, there is provided a conical edible container including an edible outer shell, an edible inner shell, an edible first adhesive layer provided between the outer shell and the inner shell, and which bonds the outer shell and the inner shell, and a second adhesive layer which maintain the outer shell and the inner shell in a cone shape.

At least a partial area of the edible container may have a first sectional structure, in which the inner shell, the first adhesive layer, and the outer layer are sequentially stacked in a direction that faces an outer side from an inner side, and a second sectional structure, in which the inner shell, the first adhesive layer, the outer layer, the second adhesive layer, the inner shell, the first adhesive layer, and the outer shell are sequentially stacked.

In an embodiment, the at least partial area of the edible container may further have a third sectional structure, in which the inner shell, the first adhesive layer, the outer shell, the second adhesive layer, and the outer shell are sequentially stacked.

In an embodiment, the first sectional structure, the second sectional structure, and the third sectional structure may be sequentially appear along a circumferential direction of the conical edible container.

In an embodiment, the outer shell may include at least one selected from a group consisting of chlorella, green laver, sea staghorns, laver, agar-agar, seaweed, kelp, gulfweed, and fusiformis.

In an embodiment, the first adhesive layer and the second adhesive layer may be formed of an edible material that provides a hardness of 1500 gf or more when being baked in a specific condition.

In an embodiment, the edible material may include at least one of flour paste, rice paste, and sticky rice paste.

In an embodiment, the inner shell may be formed of an edible material, a hardness of which decreases when the edible material absorbs moisture, and which provides a hardness of 1500 gf or more when being baked in a specific condition.

In an embodiment, the inner shell may include at least one selected from a group consisting of rice, barley, beans, foxtail millet, proso millet, sorghum, flour, and corns.

In an embodiment, an area of a specific length from an apex of the edible container may have a sectional structure having only the outer shell.

In an embodiment, the specific length of the area may be 0.01 cm to 1.5 cm.

In an embodiment, an aspect ratio of the edible container may be 1 1 to 1 10.

In an embodiment, the outer shell and the inner shell may have any shape of a circular shape, a rectangular shape, and a fan shape when the outer shell and the inner shell are unfolded.

In an embodiment, the outer shell and the inner shell may be wound in a 3-dimensional way in a state, in which the outer shell and the inner shell are bonded to each other by the first adhesive layer such that the centers of weight of the outer shell and the inner shell substantially coincide with each other, and are bonded to each other to form a conical shape.

In an embodiment, the outer shell and the inner shell may be wound in a 3-dimensional way in a state, in which the outer shell and the inner shell are bonded to each other by the first adhesive layer such that the centers of weight of the outer shell and the inner shell substantially do not coincide with each other, and are bonded to each other to form a conical shape.

In an embodiment, in a state in which the outer shell and the inner shell are bonded to each other, an area from one point of an edge of the outer shell to a central point Oc. at which the outer shell and the inner shell are bonded to each other, is cut off, and parts located on circumferentially opposite sides of a cutting line may be superimposed on each other to be wound in a conical shape and may be bonded to each other by the second adhesive layer to form the conical shape.

In order to solve the problems, there is provided a conical edible container including an edible outer shell, an edible inner shell, an edible first adhesive layer provided between the outer shell and the inner shell, and which bonds the outer shell and the inner shell, and a second adhesive layer which maintain the outer shell and the inner shell in cone shapes, wherein at least a partial area of the conical shape has a third sectional structure, in which at least the inner shell, the first adhesive layer, and the outer shell are sequentially stacked in a direction that faces an outer side from an inner side, and a fourth sectional structure, in which at least the outer shell, the second adhesive layer, and the outer shell are sequentially stacked.

In order to solve the problems, there is provided a method for manufacturing an edible container, the method including (a) preparing an edible outer shell and an edible inner shell, (b) bonding the outer shell and the inner shell by a first adhesive layer, (c) forming an edible container of a conical shape by winding the outer shell and the inner shell in a state, in which the outer shell and the inner shell are bonded to each other, and bonding the outer shell and the inner shell by a second adhesive layer such that the conical shape is not released, and (d) baking the conical shape in a specific condition.

In (c), the second adhesive layer may be applied between an inner part of the outer shell, which is not shelled by the inner shell, and an outer part of the outer shell, which is superimposed on the inner part, and the second adhesive layer may be applied also between the inner part of the inner shell and the outer part of the outer shell, in the state of the conical state, and at least a partial area of the conical shape may have a first sectional structure, in which the inner shell, the first adhesive layer, and the outer layer are sequentially stacked in a direction that faces an outer side from an inner side, and a second sectional structure, in which the inner shell, the first adhesive layer, the outer layer, the second adhesive layer, the inner shell, the first adhesive layer, and the outer shell are sequentially stacked.

In an embodiment, the method may further include baking the container.

Advantageous Effects

The embodiments of the present disclosure have one or more of the following effects.

First, because the edible outer shell and the edible inner shell are bonded to each other by the edible adhesive layer to form the conical edible container, the entire edible container may be provided as an edible one.

Second, the adhesive layer may be provided between the inner part of the outer shell, which is not shelled by the inner shell and the outer part of the outer shell, which is superimposed on the inner part, in the state of the conical shape, whereby the inner shell, which directly contacts a food when the food is contained in the interior of the container, is sanitarily prevented from being exposed to the outside of the container. Further, because the parts of the outer shell are bonded to each other by the adhesive layer, the parts of the same material are bonded to each other whereby the basic structure of the conical shape may be prevented from being released.

The effects of the present disclosure are not limited thereto, and other unmentioned effects of the present disclosure may be clearly appreciated by those skilled in the art from the following descriptions.

MODE FOR INVENTION

Figure 1:
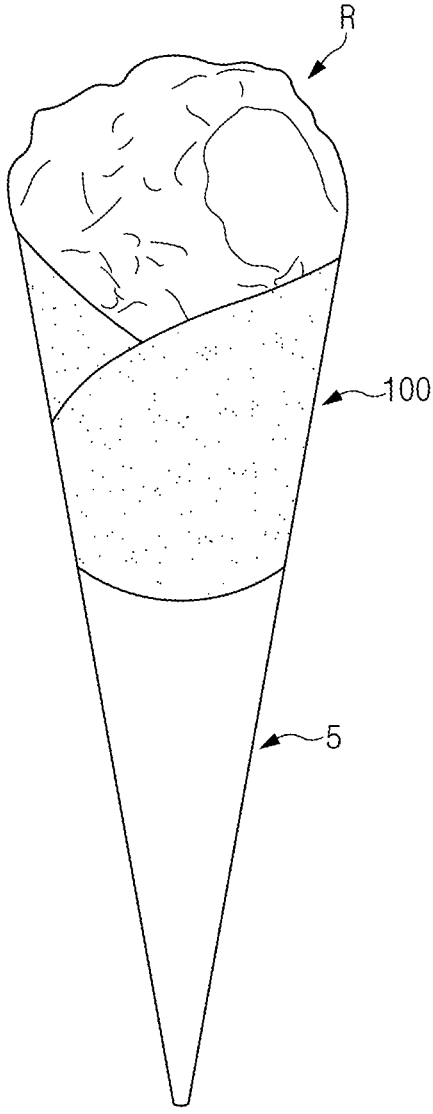
FIG. 1 is a view illustrating an example of a product that uses a conical edible container according to the present disclosure.

Hereinafter, some embodiments of the present disclosure will be described in detail with reference to the exemplary drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the components from other components, and the essences, sequences, orders, and the like of the components are not limited by the terms. When it is described that one element is connected, coupled, or electrically connected to another element, the element may be directly connected or coupled to the other element, but a third element may be connected, coupled, or electrically connected between the elements.

First Embodiment

Figure 2:
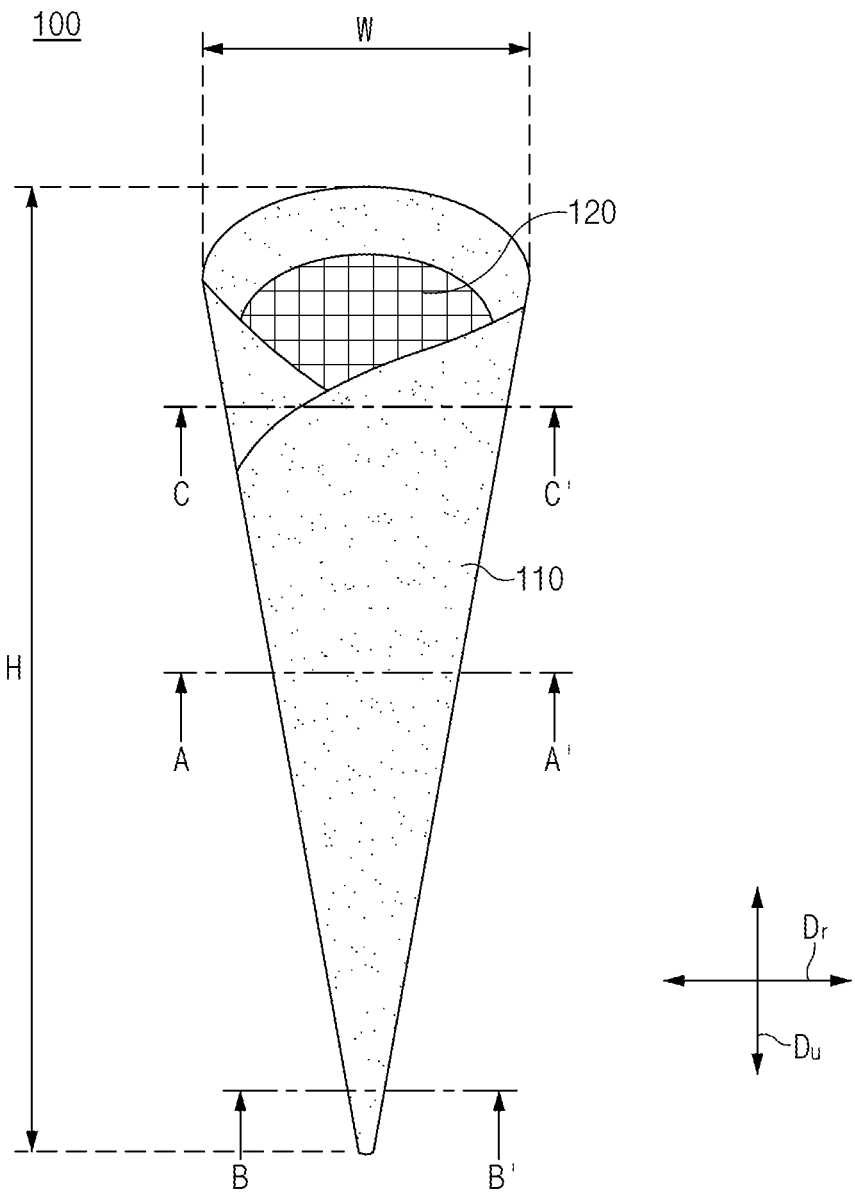
FIG. 2 is a view illustrating a conical edible container according to a first embodiment of the present disclosure, which is viewed from one side.
Figure 3:
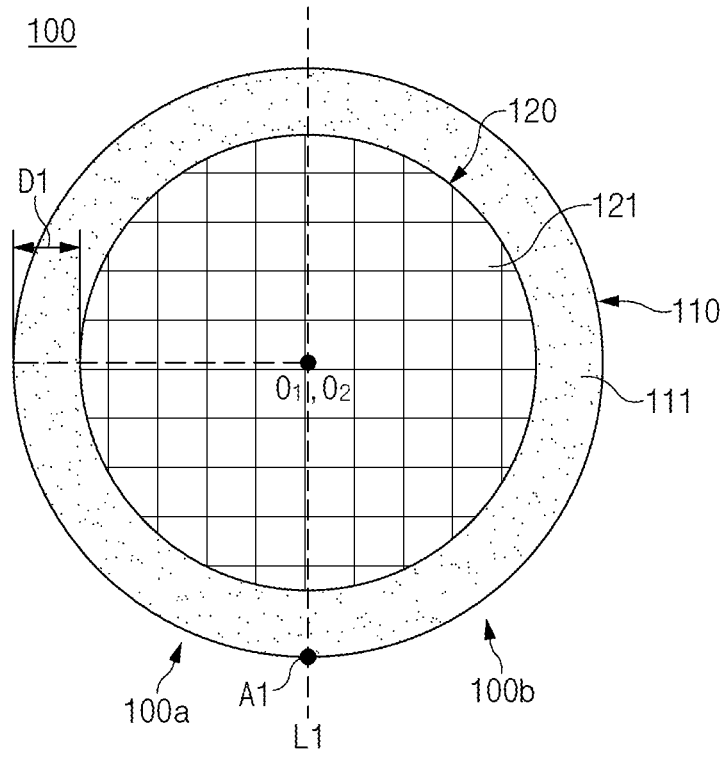
FIG. 3 is a view illustrating a state, in which a body sheet of the conical edible container according to the first embodiment of the present disclosure is unfolded.
Figure 4:
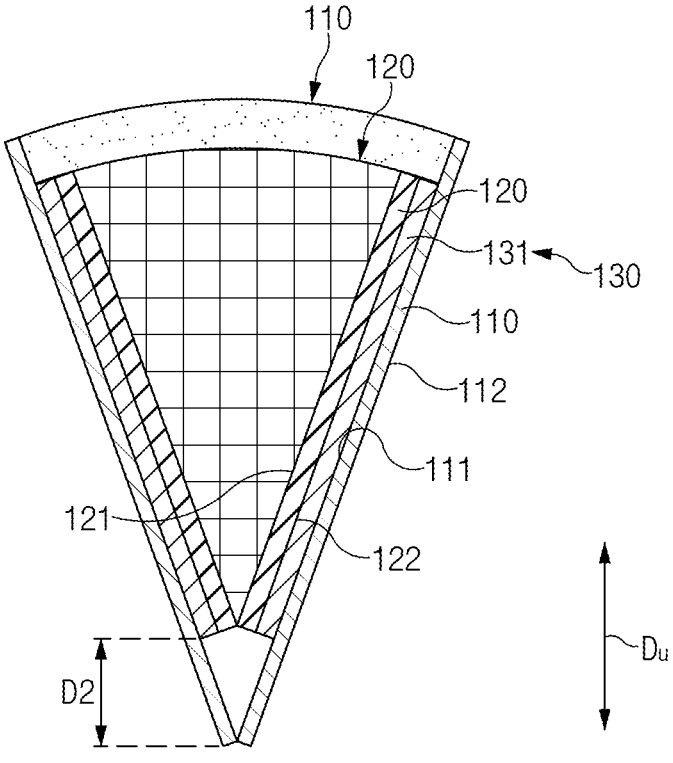
FIG. 4 is a cross-sectional view of the conical edible container of FIG. 2, taken along a vertical direction.

FIG. 1 is a view illustrating an example of a product that uses a conical edible container according to the present disclosure. FIG. 2 is a view illustrating a conical edible container according to a first embodiment of the present disclosure, which is viewed from one side. FIG. 3 is a view illustrating a state, in which a body sheet of the conical edible container according to the first embodiment of the present disclosure is unfolded. FIG. 4 is a cross-sectional view of the conical edible container of FIG. 2, taken along a vertical direction Du.

Referring to FIG. 1, a product containing contents R in a conical edible container according to the present disclosure may considered. Because a conical interior space is provided in the interior of the conical edible container, the contents R may be housed in the interior space. For example, the contents R may include rice.

It may be considered to surround at least a portion of the conical edible container with a gripping sheet 5. The gripping sheet 5 may shell a partial area including a portion corresponding to an apex of the conical edible container. In this case, because a hand may be prevented from directly contacting the conical edible container when the product is gripped by the hand, it is sanitary.

As illustrated in FIG. 1, because the gripping sheet 5 is configured to have a conical shape and a portion of the gripping sheet 5, which corresponds to a bottom surface of the conical shape, is opened, the conical edible container may be inserted into the opened portion.

Referring to FIGS. 2, 3, and 4, the conical edible container 100 according to the present embodiment includes an outer shell 110, an inner shell 120, and an adhesive layer 130.

The conical edible container 100 is made to have a conical space structure by winding the outer shell 110 and the inner shell 120 in a state in which the outer shell 110 and the inner shell 120 are bonded to each other through the adhesive layer 130. The edible container 100 may include a lower end, at which an apex is located, and an upper end including an opening such that foods are loaded.

The outer shell 110 may include an edible material. The outer shell 110 may include a dry seaweed sheet.

The dry seaweed sheet is obtained by drying seaweeds themselves or flakes or powder of the seaweeds into a thin sheet form having an arbitrary shape, and green algae, such as chlorella, green laver, and sea staghorns, red algae such as layer and agar-agar, brown algae such as seaweed, kelp, gulfweed, and fusiformis may be used as the seaweeds used as the material of the dry seaweed sheet alone or in a combination thereof, and as a representative example, layer may be dried and used alone or may be dried together with green laver, chlorella, and seaweed. In order to further improve the flavor of the seaweeds, various seasonings may be further added to the seaweeds. For example, the outer shell 110 may include seaweed.

The inner shell 120 may include an edible material. The inner shell 120 may be a grain sheet. The grain sheet is a thin sheet having an arbitrary shape, and is manufactured of a grain material, such as rice powder and/or starch, and water. The grain sheet may be manufactured by additionally mixing rice powder with starch powder. Furthermore, the unique taste of a source material, such as shrimps, sesames, black sesames, layer powder, anchovies, squids, or a combination thereof, may be added and the chewing taste may be improved by adding the source material. In the grain sheet, for example, the content of the rice powder may be 1 to 100 parts by weight with respect to 100 parts by weight of the content of the starch, and preferably, may be 1 to 50 parts by weight, and more preferably, may be about 20 parts by weight with respect to 100 parts by weight of the starch. The rice may be polished rice, unpolished rice, red rice, green rice, and/or sticky rice. The starch may be selected from a group consisting of potato starch, sweet potato starch, tapioca starch, corn starch, rice starch, and a combination thereof, and preferably, tapioca starch may be selected. According to an implementation of the present disclosure, a grain sheet manufactured of rice of 30 parts by weight with respect to tapioca starch of 100 parts by weight may be used. The grain sheet may be used after a grain sheet product that are on sale in the markets or may be directly manufactured by using a conventional known method. For example, the grain sheet may include rice paper.

The inner shell 120 may have a property for reinforcing the outer shell 110 that is relatively fragile. For example, the inner shell 120 may be formed of a material having a strength that is stronger than that of the outer shell 110. For example, the inner shell 120 may be formed of a material having an elasticity that is higher than that of the outer shell 110. For example, the inner shell 120 may have a strength that is strong enough to maintain the conical shape without using a separate support member because it is easily formed in the conical shape as the strength thereof becomes lower in a state of a high content of moisture and the strength thereof is improved after being baked in a specific condition. For example, the inner shell 120 may provide a hardness of 1500 gf or more when it is baked in a condition of 150° C. to 200° C. and 5 minutes to 10 minutes. The hardness may provide a strength that is sufficient enough to prevent the inner shell 120 from being easily broken even though a person eats a food while gripping the food with a hand when contents of 50 g to 150 g are contained in the conical edible container.

The body sheet 100 may be manufactured by bonding the outer shell 110 and the inner shell 120. The body sheet 100 may be manufactured by joining one outer shell 110 and one inner shell 120, but also may be manufactured by joining one or more outer shells 110 and one or more inner shells 120. Then, at least one side surface of the outer shell 110 may be cut to be larger than one side surface of the inner shell 120. For example, when both of the outer shell 110 and the inner shell 120 are circular, the diameter of the outer shell 110 may be larger than the diameter of the inner shell 120 by 3 cm, in detail, by 2 cm, and in more detail, by 1 cm. However, the present disclosure is not limited thereto, and the outer shell 110 and the inner shell 120 may be joined to each other to have substantially the same diameter. In this case, for convenience of the process, after the inner shell 120 is joined while the diameter of the outer shell 110 is slightly larger than that of the inner shell 120, the protruding portion of the outer shell 110 with respect to the inner shell 120 may be cut.

The joining of the outer shell 110 and the inner shell 120, which is performed in the process of manufacturing the body sheet 100, may be performed according to any method that is sitologically allowed. For example, the body sheet 100 may be manufactured by applying the adhesive layer 130 to at least one of the at least one outer shell 110 and the at least one inner shell 120 and pressing the outer shell 110 and the inner shell 120 after seaming them. Then, the adhesive that forms the adhesive layer 130 may be pure water or an edible liquid having viscosity, for example, salty water, a sugar solution, starch water, or a grain glue. The grain glue may include flour glue, rice glue, or sticky rice glue. Furthermore, in order to improve a crispy chewing taste of a finally manufactured dry seaweed snack, the adhesive may minimally include water within a range of having viscosity.

The adhesive layer 130 may include a first adhesive layer 131 that bonds the outer shell 110 and the inner shell 120, and a second adhesive layer 132 that maintains the 3-dimensional shape of the edible container 100. The first adhesive layer 131 and the second adhesive layer 132 may be of the same material, but the present disclosure is not limited thereto.

Because the adhesive layer 130 includes a material in a liquid or semi-solid state having viscosity, the strength of the adhesive layer 130 may be decreased by providing moisture to the inner shell 120, as well as the bonding force that bonds the outer shell 110 and the inner shell 120, to facilitate bonding and formation of the inner shell 120. The adhesive layer 130 may provide a strength that is sufficient enough to be prevented from being easily broken when a person eats a food while gripping the food with a hand as the content of moisture of the adhesive layer 130 become lower and the hardness of the adhesive layer 130 becomes higher when the adhesive layer 130 is baked in a specific condition. For example, the adhesive layer 130 may include glue of grain substances. For example, the glue of grain substances is a glue which is heated and in which rice powder and water are mixed, and the substances and the concentration of the glue may be selected such that a hardness of 1500 gf or more may be provided when the glue is baked in a condition of 150° C. to 200° C. and 5 minutes to 10 minutes. For example, the adhesive layer 130 may include sticky rice paste.

In order to restrain the outer shell 110 and the inner shell 120 from being released from the conical shape due to the inner shell 120 having the elasticity that is stronger than that of the outer shell 110 after the outer shell 110 and the inner shell 120 are wound in the conical shape, the second adhesive layer 132 may be provided between the outer surface of the outer shell 110 at the wound-in portions, and the inner surface of the outer shell 100 at the shelling portions and the inner surface of the inner shell 120. Through the arrangement, the second adhesive layer 132 may provide a sufficient bonding force for maintaining the conical shape.

Referring to FIG. 3, the inner part of the outer shell 10, which is not shelled by the inner shell 120, may be defined as a part of the inner surface 111 of the outer shell, which is not bonded to the inner shell 120, in a state in which the inner shell 120 and the outer shell 110, which are bonded to each other, are unfolded. That is, the inner part of the outer shell 110, which is not shelled by the inner shell 120, may be defined as a part of the entire area of the inner surface 111 of the outer shell, which is located between an edge of the inner shell 120 and an edge of the outer shell 110.

The outer part of the outer shell superposed on the inner part may be defined as an outer surface 112 of the outer shell, which is superimposed on the inner part of the outer shell 110, which is not shelled by the inner shell 120, with respect to a direction that faces the outer side from the center of the conical shape. That is, the outer part of the outer shell 110, which is superimposed on the inner part, may be defined as a part of the outer surface 112 of the outer shell, which contacts the inner part of the outer shell 110, which is not shelled by the inner shell 111.

The outer shell 110 and the inner shell 120 may have properties of making a bonding force of the adhesive layer 130, which bonds the parts of the outer shell, stronger than a bonding force of the adhesive layer 130, which bonds parts of the inner shell 120, or a bonding force of the adhesive layer, which bonds the inner shell 120 and the outer shell 110.

For example, when the outer shell 110 includes laver, the inner shell 120 includes rice paper, and the adhesive layer 130 includes glue including grains, the outer shell 110 and the inner shell 120 may have properties of making a bonding force of the adhesive layer 130, which bonds the parts of the outer shell, stronger than a bonding force of the adhesive layer 130, which bonds parts of the inner shell 120, or a bonding force of the adhesive layer, which bonds the inner shell 120 and the outer shell 110.

An adhesive layer 132 may be further provided between portions, at which the outer surface 112 of the outer shell and the inner surface 121 of the inner shell are superimposed on each other such that the inner shell 120 and the outer shell 110 are bonded to each other. The individual strengths of the inner shell 120 and the adhesive layer 130 may be improved, and a coupling force between the layer structures may be improved as well by baking the edible container 100 having the same in a specific condition. The edible container 100 formed through the process may have a hardness of 1500 gf or more as a whole, and thus may sufficiently endure a repulsive force due to the elasticity of the inner shell 120 and an external force transmitted when a person grips the edible container 100.

Meanwhile, in another embodiment, water may be provided as the adhesive layer 132 between the inner surface 121 of the inner shell and the outer surface 112 of the outer shell, and the inner shell 120 and the outer shell 110 may be baked in a specific condition after being baked to implement the edible container 100 of the conical shape. When pure water is used as the adhesive layer 132, the adhesive layer 132 evaporates in the process of baking the edible container 100, and a coupling structure of the inner surface 121 of the inner shell and the outer surface 112 of the outer shell may be directly formed.

The conical edible container is manufactured by baking the manufactured conical body sheet 100. The above-described process of baking the body sheet 100 is a process of realizing a crispy chewing taste in a finally manufactured joined body by further removing moisture that is present in the outer shell 110, the inner shell 120, the adhesive, and the like that constitute the body sheet 100. Accordingly, as described above, the process of baking the body sheet 100 may be performed in an environment, for example, in an oven, in which moisture is not present, for example, in a temperature condition of 175° C. or more, 177° C. or more, 179° C. or more, or 180° C. or more, and 195° C. or less, 193° C. or less, 191° C. or less, or 190° C. or less, and for a period of time of 3 minutes or more, 4 minutes or more, 5 minutes or more, or 6 minutes or more, and 15 minutes or less, 13 minutes or less, 11 minutes or less, or 9 minutes or less. When the process of baking the body sheet 100 as described above is performed in a temperature condition of less than 175° C. or is performed for a period of time of less than 3 minutes, the moisture in the body sheet 100 does not sufficiently decrease and a crispy chewing taste cannot be realized in the finally manufactured joined body, and when the process is performed in a temperature condition of more than 195° C. or is performed for a period of time of more than 15 minutes, the seaweeds that constitute the outer shell 110 are burned out.

Meanwhile, another embodiment of the present disclosure may further include a process of forming the body sheet 100 by using a mold before baking the body sheet 100 as described above. For example, the body sheet 100 may be formed in a conical shape by surrounding an outer peripheral surface of the mold having a conical shape with the body sheet 100, by using the mold having the conical shape. Then, the outer peripheral surface of the mold may be surrounded such that the outer shell 110 of the body sheet 100 is exposed to the outside.

When the process of forming the body sheet 100 is performed, in order to prevent the body sheet 100 from returning to the original state and manufacture the conical shape as it is, the body sheet 100 may be further joined by applying the adhesive to the superimposed portion of the body sheet 100 when the body sheet 100 surrounds the outer peripheral surface of the mold, and further, the body sheet 100 formed by using the mold may be baked together with the mold while the body sheet 100 is mounted on the mold.

The conical shape manufactured by baking the body sheet together with the mold while the body sheet is mounted on the mold may be separated from the mold after being cooled while being mounted on the mold. The cooling process is a process for preventing the conical shape from being broken when the conical shape is separated from the mold, and may be performed in a temperature condition of 50° C. or less, 40° C. or less, 30° C. or less, or a room temperature, for a period of time of 1 minute or more, 3 minutes or more, 5 minutes or more, or 7 minutes or more, and 20 minutes or less, 17 minutes or less, 15 minutes or less, or 13 minutes or less. After the cooling process, the conical shape separated from the mold may maintain the shape formed by the mold.

The hardness of the baked body sheet 100 may be 1500 g or more, 1700 g or more, 1900 g or more, or 2100 g or more, and may be 6000 g or less, 5800 g or less, 5600 g or less, or 5500 g or less. When the hardness of the body sheet 100 is lower than 1500 g, the crispness of the finally manufactured conical edible container is not sufficient so that the chewing taste is decreased, and when the hardness is higher than 6000 g, the finally manufactured conical edible container is too hard to be taken.

Referring to FIG. 2, the basic structure of the conical shape may be configured such that a ratio of the diameter (or the width W) of a portion corresponding to the bottom surface of the conical shape and the height H from the bottom surface of the conical shape to the apex is a value of 1:1 to 1:10. That is, the aspect ratio of the conical shape may be 1:1 to 1:10. This may be properly selected in consideration of making the conical edible container such that the it is gripped conveniently and of making the conical edible container such that contents are appropriately contained in the interior of the conical edible container. For example, when the ratio of the width W and the height H is close to 1:10, it may be easy to grip the conical edible container but an interior space that houses the contents may be small, whereas when the ratio of the width W and the height H is closer to 1:1, the interior space that may house the contents with the conical edible container may be wide but it may be difficult to grip the conical edible container.

The moisture in the outer shell 110 and the inner shell having the conical basic structure may be removed after heating when the outer shell 110 and the inner shell are heated.

Generally, when the material is heated, the moisture escapes from the material and thus the strength of the material becomes higher and the elasticity of the material decreases instead.

For example, when the outer shell 110 is formed of laver, the inner shell 120 is formed of rice paper, and the adhesive layer 130 is formed of glue including grain substances, the outer shell 110, the inner shell 120, and the adhesive layer 130 are stuck to each other when the conical basic structure is heated, whereby coupling force may be improved and the overall structure of the conical basic structure may be increased. Accordingly, in the conical basic structure formed by winding the outer shell 110 and the inner shell 120, a state before the heating may correspond to a semi-product and a state after the heating may correspond to a finished product. However, this is only for classification, and a finished product may be constituted by using the conical basic structure before the heating corresponding to the semi-product.

The outer shell 110 and the inner shell 120 may have any shape of a circular shape, a rectangular shape, and a fan shape when being unfolded.

Referring to FIG. 3, the outer shell 110 and the inner shell 120 having circular shapes as a whole while being unfolded may be prepared.

In an embodiment, the outer shell 110 and the inner shell 120 are arranged to form concentric circles, and may be bonded to each other by the first adhesive layer 131. That is, the outer shell 110 and the inner shell 120 may be bonded to each other such that the center O1 of the outer shell and the center O2 of the inner shell coincide with each other.

In the embodiment, the outer shell 110 and the inner shell 120 may be wound in a 3-dimensional way in a state while being bonded to each other by the first adhesive layer 131 such that the centers of weight thereof coincide with each other, and may be bonded to each other by the second adhesive layer 132 to form the conical shape. The outer shell 110 and the inner shell 120 may be wound while being bonded to each other, to form the conical edible container, and the outer shell 110 and the inner shell 120 are bonded to each other by the second adhesive layer 132 such that the conical shape is not released, whereby the edible container that maintains the conical basic structure may be manufactured.

Furthermore, as described above, the strength (or hardness) of the conical edible container formed as described above may be increased by baking the conical edible container in a specific condition.

The outer shell 110 may have a diameter that is larger than that of the inner shell 120. For example, the radius of the outer shell 110 may be larger than the radius of the inner shell 120 by a first distance D1. That is, the outer shell 110 and the inner shell 120 may be configured such that the edge of the inner shell 120 and the edge of the outer shell 110 are spaced apart from each other by the first distance D1.

The inner shell 120 may be bonded to the inner surface 111 of the outer shell. That is, the outer surface 122 of the inner shell and the inner surface 111 of the outer shell may be bonded to each other by the adhesive layer.

A process of providing the conical basic structure by winding the inner shell 120 and the outer shell 110 in the conical shape will be described as follows.

The body sheet 100 may be manufactured by bonding the outer shell 110 and the inner shell 120 by the first adhesive layer 131. The body sheet 100 formed by bonding the inner shell 120 and the outer shell 110 by the first adhesive layer 131 may include a first wing part 100a and a second wing part 110b divided by an imaginary line L1.

The first wing part 100a and the second wing part 100b may be superimposed on each other while one point A1, at which the imaginary line L1 meets an edge of the body sheet 100, is taken as the apex. Then, they may be superimposed on each other such that the first wing part 100a is located on the outer side of the second wing part 100b or the second wing part 100b is located on the outer side of the first wing part 100a.

The first wing part 100a and the second wing part 100b may be bonded to each other by the second adhesive layer 132 while being superimposed on each other to form the conical basic structure.

In the state in which the body sheet 100 forms the conical basic structure, the conical shape of the body sheet 100 may be maintained by balancing a force of unfolding the body sheet 100 by an elasticity of the inner shell 120 and a force of restraining the body sheet 100 from being unfolded, by a bonding force of the first wing part 100*a* and the second wing part 100*b*, in a state in which the body sheet 100 forms the conical shape. FIG. 4 is a cross-sectional view illustrating the conical basic structure according to the embodiment of the present disclosure, taken along a plane that is perpendicular to the bottom surface of the conical shape and passes the apex of the conical shape.

In the cross-section of FIG. 4, a layer that includes the outer shell 110 and does not include the inner shell 120, a layer that includes the inner shell 120, the outer shell 110, and the first adhesive layer 131, and a layer that includes the outer shell 110 and does not include the inner shell 120 sequentially appear continuously or discontinuously along a direction (a direction that faces the upper side from the lower side) that faces a location corresponding to the bottom surface of the conical shape from a location corresponding to the apex of the conical shape.

That is, the layer that includes the outer shell 110 and does not include the inner shell 120, the layer that includes the inner shell 120, the outer shell 110, and the first adhesive layer 131, and the layer that includes the outer shell 110 and does not include the inner shell 120 may appear continuously, but other layers may further appear between the layers and the layers may appear sequentially.

Here, when a cross-section that appears when the conical basic structure is cut at a location that is between the location corresponding to the bottom surface of the conical shape and a location corresponding to the apex of the conical shape and within a second distance D2 from the apex of the conical shape or along a plane that is parallel to the bottom surface is viewed, only the layer that includes the outer shell 110 but does not include the inner shell 120 appears.

In the embodiment, an area of a specific length from the apex of the conical shape may have a cross-sectional structure including only the outer shell 110. Then, the specific length of the area may be 0.01 cm to 1.5 cm.

When the inner shell 120 is located at a point ranging the apex of the conical shape, the apex portion of the conical shape may become relatively thick when the conical basic structure is formed, or it may not be easy to bond the apex portion of the conical shape.

In the embodiment, because the inner shell 120 is disposed also at a location that is spaced apart from the apex portion of the conical shape, the conical basic structure may be easily formed, and because parts of the outer shell 110 are bonded to each other, the bonding force may be improved.

However, according to occasions, the inner shell 120 may be disposed to extend to the apex portion of the conical shape. For example, when it is necessary to prevent the contents contained in the conical edible container from directly contacting the outer shell 110, the inner shell 120 may be disposed to extend to the apex portion of the conical shape.

Meanwhile, referring to FIG. 4, the first adhesive layer 131 is formed in an area between the inner shell 120 and the outer shell 110, but the present disclosure is not limited thereto, and the first adhesive layer 131 may be formed in an area that is narrower than the inner surface 111 of the outer shell and is wider than the outer surface 122 of the inner shell with reference to the cross-section of FIG. 4.

Figure 5:
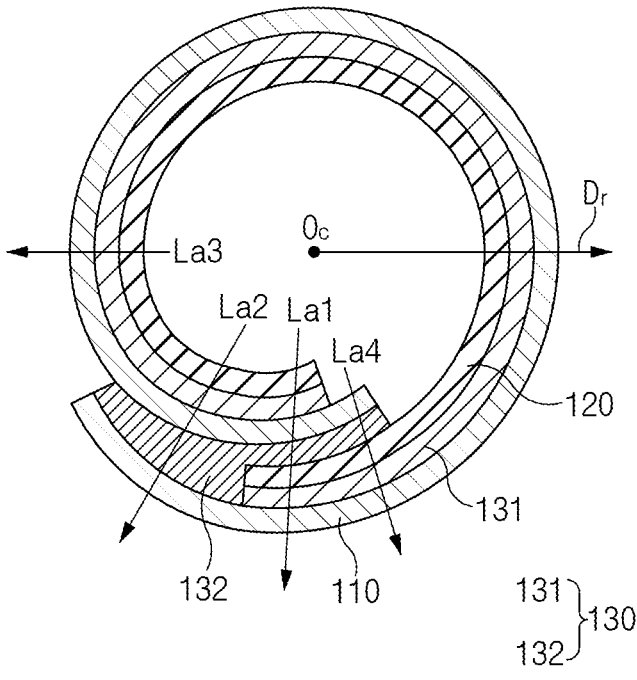
FIG. 5 is a cross-sectional view taken along line A-A' of FIG. 2.
Figure 6:
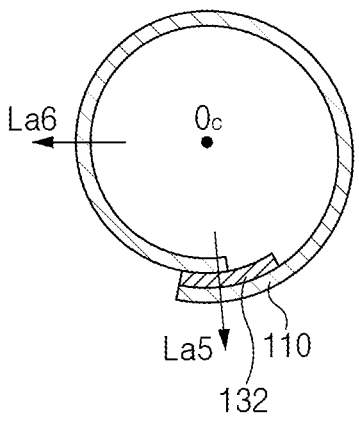
FIG. 6 is a cross-sectional view taken along line B-B' of FIG. 2.
Figure 7:
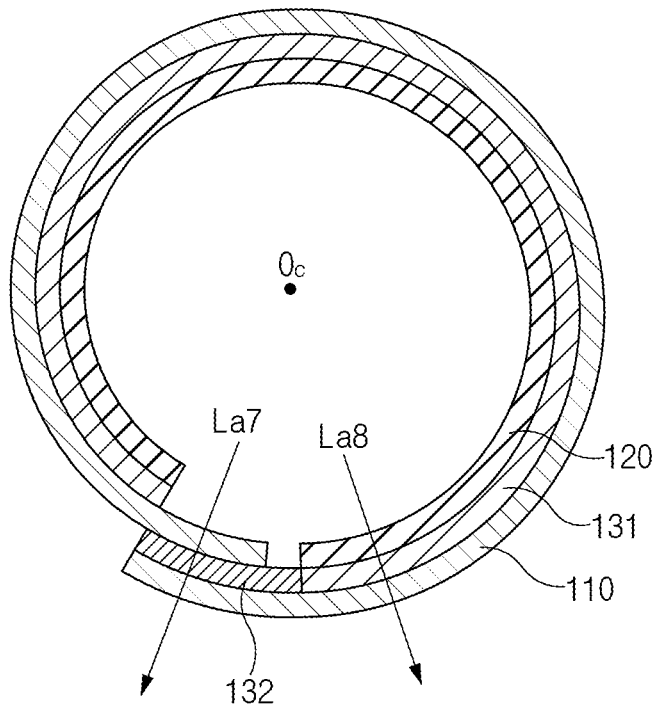
FIG. 7 is a cross-sectional view taken along line C-C' of FIG. 2.

FIG. 5 is a cross-sectional view taken along line A-A' of FIG. 2. FIG. 6 is a cross-sectional view taken along line B-B' of FIG. 2. FIG. 7 is a cross-sectional view taken along line C-C' of FIG. 2.

Hereinafter, the structure of the conical edible container according to the embodiment of the present disclosure will be described with reference to FIGS. 5, 6, and 7.

FIG. 5 is a cross-sectional view that appears when the basic structure is cut along a plane that is parallel to the bottom surface between a location corresponding to the bottom surface of the conical shape and a location corresponding to the apex of the conical shape.

In the cross-section of FIG. 5, a layer La3, in which at least the inner shell 120, the first adhesive layer 131, and the outer shell 110 are sequentially stacked, and a layer La2, in which at least the outer shell 110, the second adhesive layer 132, and the outer shell 110 are sequentially stacked, appear in the circumferential direction of the cross-section in a direction (a radial direction Dr) that faces the outer side from the inner side.

The state in which at least the inner shell 120, the first adhesive layer 131, and the outer shell 110 are sequentially stacked may be defined as a state in which the layer, in which the inner shell 120, the first adhesive layer 131, and the outer shell 110 are sequentially stacked, is basic but other layers may be further stacked.

For example, the layer, in which at least the inner shell 120, the first adhesive layer 131, and the outer shell 110 are sequentially stacked, may include a layer, in which the inner shell 120, the first adhesive layer 131, the outer shell 110, the second adhesive layer 132, and the outer shell 110 are sequentially stacked, a layer, in which the outer shell 110, the inner shell 120, the first adhesive layer 131, and the outer shell 110 are sequentially stacked, and a layer, in which the outer shell 110, the second adhesive layer 132, the inner shell 120, the first adhesive layer 131, and the outer shell 110 are sequentially stacked.

Similarly, the layer, in which at least the outer shell 110, the second adhesive layer 132, and the outer shell 110 are sequentially stacked, may be defined as a layer, in which the outer shell 110, the second adhesive layer 132, and the outer shell 110 are sequentially stacked and other layers are present or not present.

Referring to FIG. 5, in more detail, a layer La1, in which the inner shell 120, the first adhesive layer 131, the outer shell 110, the second adhesive layer 132, the inner shell 120, the first adhesive layer 131, and the outer shell 110 are sequentially stacked, a layer La2, in which the inner shell 120, the first adhesive layer 131, the outer shell 110, the second adhesive layer 132, and the outer shell 110 are sequentially stacked, a layer La3, in which the inner shell 120, the first adhesive layer 131, and the outer shell 110 are sequentially stacked, a layer La4, in which the outer shell 110, the second adhesive layer 132, the inner shell 120, the first adhesive layer 131, and the outer shell 110 are sequentially stacked may continuously appear along the circumferential direction of the cross-section of FIG. 5 in the sequence of the layer La1, the layer La2, the layer La3, and the layer La4 in the radial direction Dr.

In an embodiment, in the layer La1, the inner shell 120, the first adhesive layer 131, the outer shell 110, the inner shell 120, the first adhesive layer 131, and the outer shell 110 may be stacked. For example, when the adhesive layer 130 is not applied between the inner surface 121 of the inner shell and the outer surface 112 of the outer shell, which are superimposed on each other in the radial direction Dr, the inner shell 120, the first adhesive layer 131, the outer shell 110, the inner shell 120, the first adhesive layer 131, and the outer shell 110 may be sequentially stacked in the layer La1.

In the embodiment, in the layer L4a, the outer shell 110, the inner shell 120, the first adhesive layer 131, and the outer shell 110 may be sequentially stacked. For example, when the adhesive layer 130 is not applied between the inner surface 121 of the inner shell and the outer surface 112 of the outer shell, which are superimposed on each other in the radial direction Dr, the outer shell 110, the inner shell 120, the first adhesive layer 131, and the outer shell 110 may be sequentially stacked in the layer La1.

Referring to FIG. 6, the layer La5, in which at least the outer shell 110, the second adhesive layer 132, and the outer shell 110 are sequentially stacked in the radial direction Dr, and the layer La6 including at least the outer shell 110 may appear along the circumferential direction of the cross-section.

In an embodiment, when the outer shell 110 is wound a larger number of times, a layer, in which the second adhesive layer 132 and the outer shell 110 are alternately repeated, appears.

Referring to FIG. 7, a layer La1, in which at least the outer shell 110, the second adhesive layer 132, and the outer shell 110 are sequentially stacked, and a layer Lab, in which the inner shell 120, the first adhesive layer 131, and the outer shell 110 are sequentially stacked, appears along the circumferential direction of the cross-section.

Figure 8:
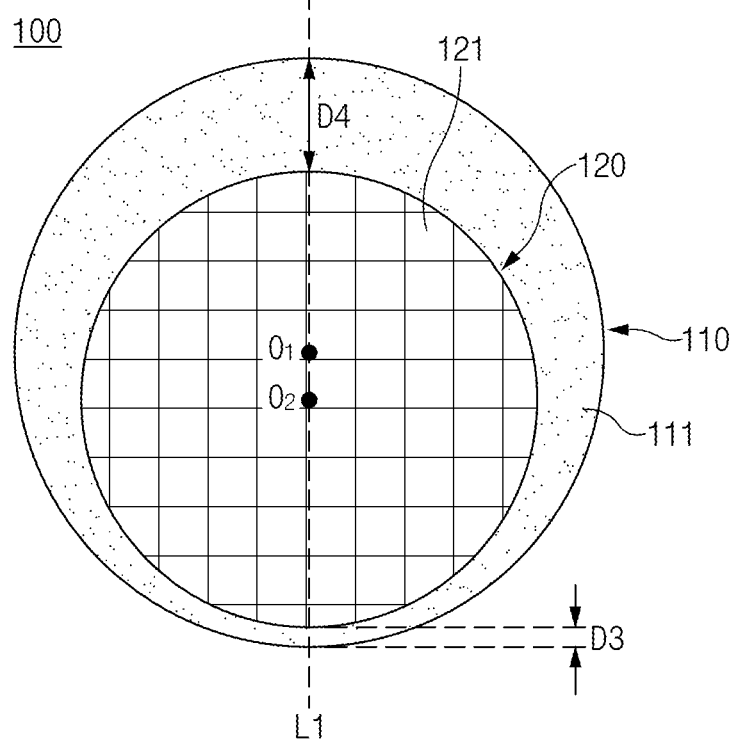
FIGS. 8, 9, and 10 are views illustrating modified embodiments of the conical edible container according to the first embodiment of the present disclosure.
Figure 9:
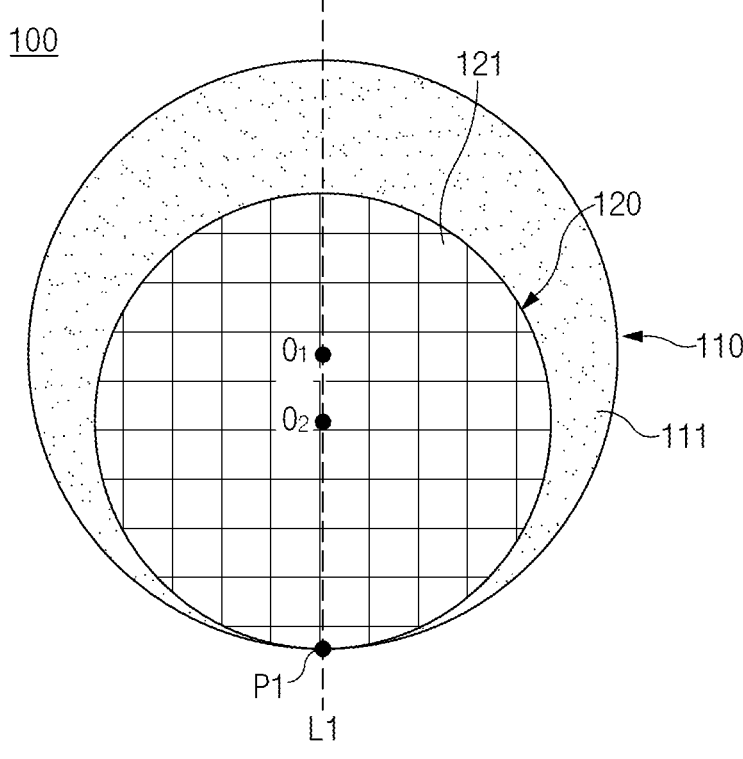
Figure 10:
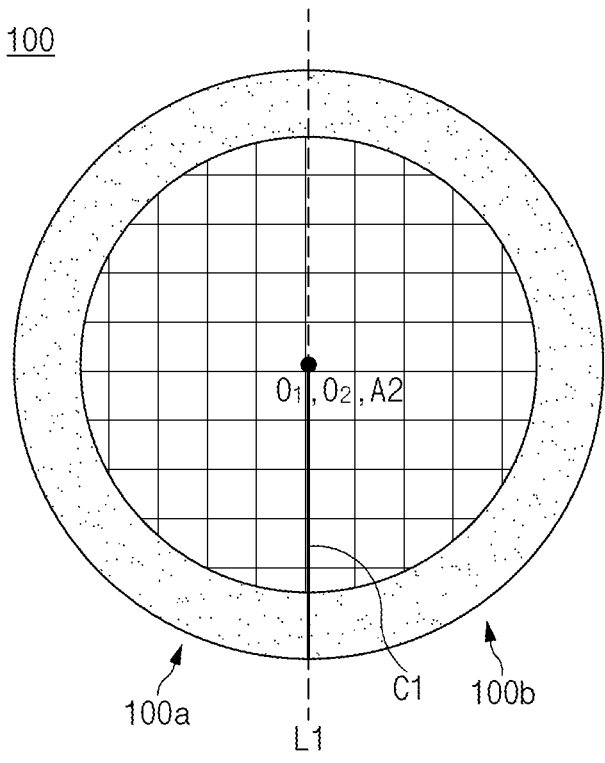

FIGS. 8, 9, and 10 are views illustrating modified embodiments of the conical edible container according to the first embodiment of the present disclosure.

Referring to FIG. 8, the inner shell 120 may be bonded to the inner surface 111 of the outer shell to be biased to any one side.

In the embodiment, the outer shell 110 and the inner shell 120 may be wound in a 3-dimensional way in a state while being bonded to each other by the first adhesive layer 131 such that the centers of weight thereof do not coincide with each other, and may be bonded to each other by the second adhesive layer 132 to form the conical shape. In the embodiment, the inner shell 120 and the outer shell 110 may be arranged such that the center O1 of the outer shell and the center O2 of the inner shell are spaced apart from each other with respect to the imaginary line L1 that crosses the outer shell 110.

In this case, when it is assumed that a distance between an edge of the outer shell 110 and an edge of the inner shell 120 is a third distance D3 on the one side, to which the inner shell 120 is biased, and a distance between the edge of the outer shell 110 and the edge of the inner shell 120 is a fourth distance D4 on a side that is opposite side to the side, to which the inner shell 120 is biased, the third distance D3 may be the shortest one of the distances between the edge of the inner shell 120 and the edge of the outer shell 110 and the fourth distance D4 may be the longest one of the distances between the edge of the inner shell 120 and the edge of the outer shell 110.

Referring to FIG. 9, the inner shell 120 and the outer shell 110 may be bonded to each other such that the edge of the inner shell 120 and the edge of the outer shell 110 contact each other at one point P1.

As illustrated in FIG. 9, a cross-section of the conical basic structure formed by winding the body sheet 100 formed by bonding the outer shell 110 and the inner shell 120, in the conical shape, may be considered.

Here, when a cross-section that appears when the conical basis structure is cut at a location that is between the location corresponding to the bottom surface of the conical shape and a location corresponding to the apex of the conical shape and within a specific distance from the apex of the conical shape or along a plane that is parallel to the bottom surface is viewed, a layer, in which at least the inner shell 110, the first adhesive layer 131, and the outer shell 110 are sequentially stacked in a direction that faces the outer side from the inner side, appears.

That is, when the conical basic structure is formed by the body sheet 100 provided as illustrated in FIG. 9, unlike the case in which the conical basic structure is formed by the body sheet 100 provided as illustrated in FIG. 3, a layer including the inner shell 120 necessarily appears on a cross-section that appears when the basic structure is cut along a plane that is parallel to the bottom surface within a specific distance from the apex of the conical shape.

Referring to FIG. 10, in the bonded state, the outer shell 110 and the inner shell 120 are cut from one point of the edge of the outer shell 110 to a central portion, at which the outer shell 110 and the inner shell 120 are bonded to each other, the portions located on the opposite circumferential sides of the cutting line C1 are superposed on each other to be wound in a conical shape, and are bonded to each other by the second adhesive layer 132 to form the conical basic structure.

The outer shell 110 and the inner shell may be bonded to each other such that the center O1 of the outer shell and the center O2 of the inner shell are superimposed on each other, and in the state in which the outer shell 110 and the inner shell 120 are bonded to each other, an area from one point of the edge of the outer shell 110 to points corresponding to the centers O1 and O2 of the outer shell 110 and the inner shell 120 may be cut.

The wing part 100a and the wing part 100b located on opposite sides of the cutting line C1 are superimposed on each other, and the conical basic structure, in which the same location as the centers O1 and O2 of the outer shell 110 and the inner shell 120 is the apex A1, may be formed.

When conical basic structure is formed by using the body sheet 100 provided as in FIG. 10, the interior space in which the contents may be contained may be formed larger.

Second Embodiment

Figure 11:
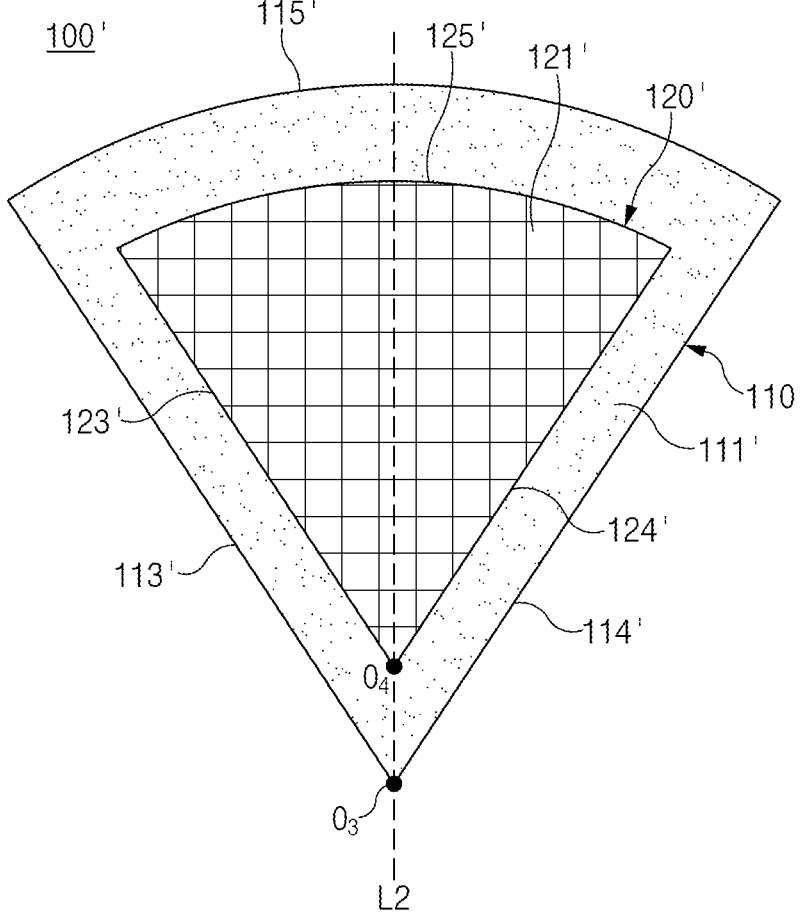
FIG. 11 is a view illustrating a state, in which a body sheet of a conical edible container according to a second embodiment of the present disclosure is unfolded.

FIG. 11 is a view illustrating a state, in which a body sheet of a conical edible container according to a second embodiment of the present disclosure is unfolded.

Referring to FIG. 11, the outer shell 110 and the inner shell 120 having fan shapes as a whole while being unfolded may be prepared.

The outer shell 110' may have a fan shape including opposite sides 113' and 114' and an arc 115'. The inner shell 120' may have a fan shape including opposite sides 123' and 124' and an arc 125'.

The inner shell 110' may have a size that is smaller than that of the outer shell 120'. That is, the inner shell 120' may be provided such that the edge of the inner shell 120' is located at the more central portion of the outer shell 110' than the edge of the outer shell 110'.

The outer shell 110' and the inner shell 120' may be disposed such that the center O4 of the inner shell is located on an imaginary line L2 that passes through the center O3 of the outer shell and crosses the outer shell 110'. That is, the outer shell 110' and the inner shell 120' may be provided to be line-symmetrical to each other with respect to the imaginary line L2.

The description of the conical edible container according to the first embodiment described with reference to FIGS. 1 to 7 may be applied to the conical edible container according to the second embodiment described with reference to FIG. 11. When the conical edible container is formed by using the body sheet of FIG. 11, as in the conical edible container according to the first embodiment, the cross-section as in FIGS. 4 to 7 may appear.

Figure 12:
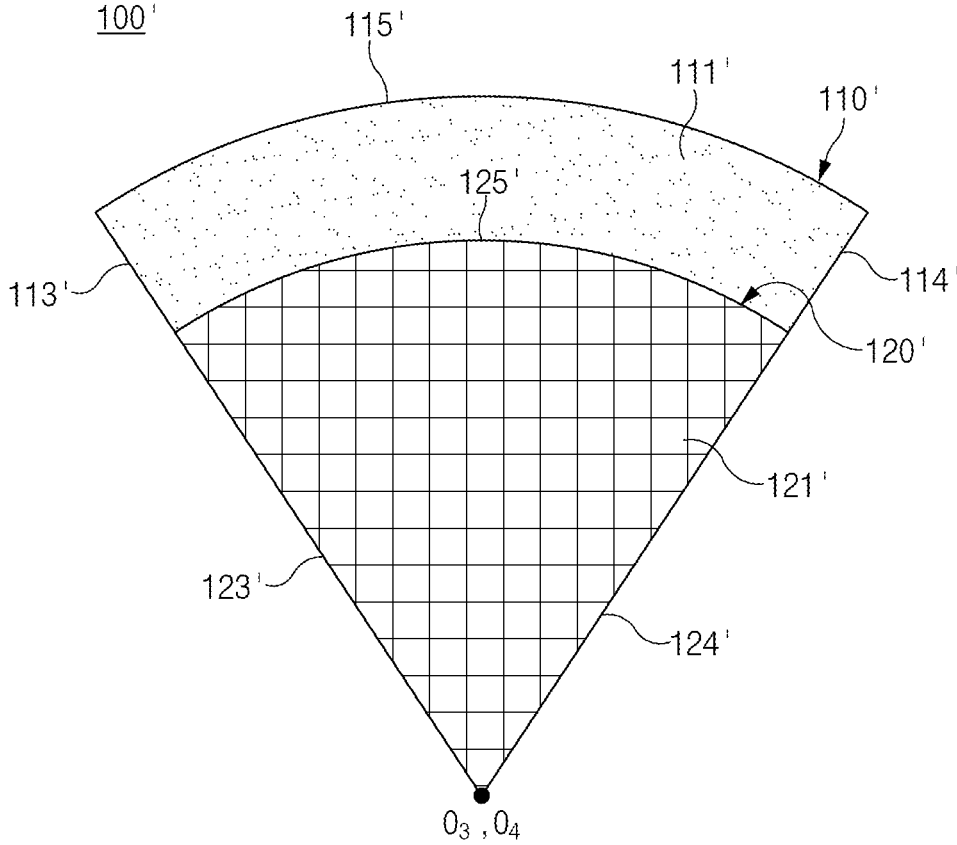
FIG. 12 is a view illustrating a modified embodiment of the conical edible container according to the second embodiment of the present disclosure.

FIG. 12 is a view illustrating a modified embodiment of the conical edible container according to the second embodiment of the present disclosure.

The outer shell 110' and the inner shell 120' may be bonded to each other such that the opposite sides 113' and 114' of the outer shell and the opposite sides 123' and 124' of the inner shell are superimposed on each other. The outer shell 110' and the inner shell 120' may be bonded to each other such that the arc 115' of the outer shell and the arc 125' of the inner shell are spaced apart from each other by a specific distance. That is, the inner shell 120' and the outer shell 110' may be configured such that the radius of the inner shell 120' is smaller than the radius of the outer shell 110', the center angle of the inner shell 120' and the center angle of the outer shell 110' are the same, and the center O3 of the outer shell and the center O4 of the inner shell are superimposed on each other.

Figure 13:
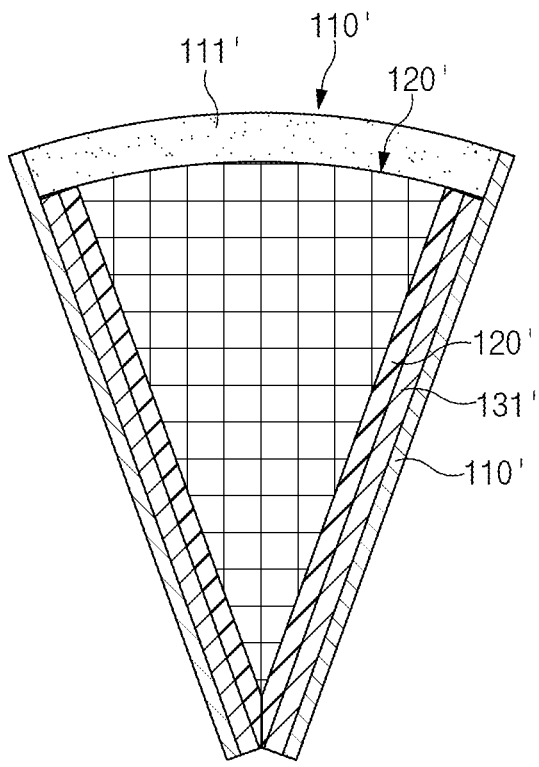
FIG. 13 is a cross-sectional view of the conical edible container of FIG. 12 formed of a body sheet, taken along a vertical direction.
Figure 14:
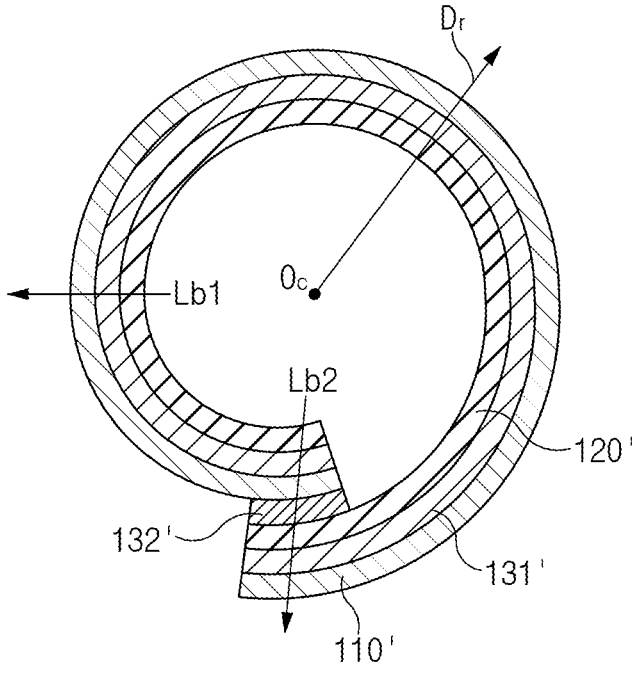
FIG. 14 is a cross-sectional view of the conical edible container of FIG. 12 formed of a body sheet, taken along a widthwise direction.

FIG. 13 is a cross-sectional view of the conical edible container of FIG. 12 formed of a body sheet, taken along a vertical direction Du. FIG. 14 is a cross-sectional view of the conical edible container of FIG. 12 formed of a body sheet, taken along a widthwise direction.

FIG. 13 is a cross-section that appears when the conical basic structure is cut on a plane that is perpendicular to the conical bottom surface and passes the apex of the conical shape.

Referring to FIG. 13, a layer that includes the inner shell 120', the outer shell 110', and the first adhesive layer 131' and a layer that includes the outer shell 110' and the first adhesive layer 131' but does not include the inner shell 120' sequentially appear along a direction that faces a location corresponding to the bottom surface of the conical shape from a location corresponding to the apex of the conical shape.

That is, according to the present embodiment, a layer structure, in which the inner shell 120' extends to the location corresponding to the apex of the conical shape, appears.

Referring to FIG. 14, a layer Lb1, in which at least the inner shell 120', the first adhesive layer 131', and the outer shell 110' are sequentially stacked in a direction that faces the outer side from the inner side, and a layer Lb2, in which at least the inner shell 120', the first adhesive layer 131', the outer shell 110', the second adhesive layer 132', the inner shell 120'), the first adhesive layer 131', and the outer shell 110' are sequentially stacked, appear along the circumferential direction of the cross-section.

That is, according to the present embodiment, a layer, in which the inner shell 120' and the outer shell 110' are bonded to each other while the second adhesive layer 132' being interposed therebetween.

Because the inner shell 120' having a strength that is stronger than that of the outer shell 110' is provided in the entire circumferential area of the body sheet when the conical edible container as in the embodiment described with reference to FIGS. 12 to 14 is provided, the strength of the conical edible container may be improved further.

For example, when a bonding force when the inner shell 120' and the outer shell 110' are bonded to each other by the second adhesive layer 132' is stronger than a bonding force when parts of the inner shell 120' are bonded to each other by the second adhesive layer 132' or a bonding force when parts of the outer shell 110' are bonded to each other by the second adhesive layer 132', as in the present embodiment, it may be advantageous for the structure of the conical edible container to bond the inner shell 120' and the outer shell 110' with the second adhesive layer 132'.

Although the present disclosure has been described with reference to the limited embodiments and the drawings, the present disclosure is not limited thereto, and the present disclosure may be variously carried out by an ordinary person in the art within the technical spirit of the present disclosure and the equivalent ranges of the claims.

The invention claimed is:

1. A conical edible container comprising:
an outer shell which is edible;
an inner shell which is edible;
an edible first adhesive layer provided between the outer shell and the inner shell, and configured to bond the outer shell and the inner shell; and
an edible second adhesive layer configured to maintain the outer shell and the inner shell in a conical shape,
wherein at least a partial area of the conical edible container has a first sectional structure, in which the inner shell, the edible first adhesive layer, and the outer shell are sequentially stacked in a direction that faces an outer side from an inner side, and a second sectional structure, in which the inner shell, the edible first adhesive layer, the outer shell, the edible second adhesive layer, the inner shell, the edible first adhesive layer, and the outer shell are sequentially stacked, and a third sectional structure, in which the inner shell, the edible first adhesive layer, the outer shell, the edible second adhesive layer, and the outer shell are sequentially stacked, and
wherein the outer shell is larger than the inner shell so that the entire inner shell is superimposed on the outer shell, and
wherein the first sectional structure, the second sectional structure, and the third sectional structure are sequentially arranged along a circumferential direction of the conical edible container, and
wherein the edible second adhesive layer is positioned between the outer shell and the inner shell to reinforce bonding therebetween in the second sectional structure, and the edible second adhesive layer is positioned between overlapping portions of the outer shell to bond the outer shell to itself in the third sectional structure, and
wherein the edible second adhesive layer is configured to maintain the conical shape by counteracting an elasticity of the inner shell, the elasticity of the inner shell being greater than an elasticity of the outer shell.

2. The conical edible container of claim 1, wherein the outer shell includes at least one edible material selected from a group consisting of chlorella, green laver, sea staghorns, laver, agar-agar, seaweed, kelp, gulfweed, and fusiformis.

3. The conical edible container of claim 1, wherein the edible first adhesive layer and the edible second adhesive layer are formed of an edible material that provides a hardness of 1500 gf or more when being baked.

4. The conical edible container of claim 3, wherein the edible material includes at least one of flour paste, rice paste, and sticky rice paste.

5. The conical edible container of claim 1, wherein the inner shell is formed of an edible material, a hardness of which decreases when the edible material absorbs moisture, and which provides a hardness of 1500 gf or more when baked.

6. The conical edible container of claim 5, wherein the inner shell includes at least one edible material selected from a group consisting of rice, barley, beans, foxtail millet, proso millet, sorghum, flour, and corn.

7. The conical edible container of claim 1, wherein an area of a specific length from an apex of the conical edible container has a sectional structure having only the outer shell.

8. The conical edible container of claim 1, wherein the outer shell and the inner shell have a shape selected from a circular shape, a rectangular shape, and a fan shape when the outer shell and the inner shell are unfolded.

9. The conical edible container of claim 8, wherein the outer shell and the inner shell each comprise a center of weight and the outer shell and the inner shell are bonded to each other by the edible first adhesive layer such that the center of weight of the outer shell and the center of weight of the inner shell substantially coincide with each other, and the outer shell and the inner shell are bonded to each other by the edible second adhesive layer to form the conical shape.

10. The conical edible container of claim 8, wherein the outer shell and the inner shell each comprise a center of weight and the outer shell and the inner shell are bonded to each other by the edible first adhesive layer such that the center of weight of the outer shell and the center of weight of the inner shell substantially do not coincide with each other and the outer shell and the inner shell are bonded to each other by the edible second adhesive layer to form the conical shape.

11. The conical edible container of claim 8, wherein in a state where the outer shell and the inner shell are bonded to each other by the edible first adhesive layer to form a body sheet, a cutting line is formed from one point of an edge of the outer shell to a central point of the outer shell and the inner shell, and parts located on circumferentially opposite sides of the cutting line are superimposed and bonded to each other so as to form the conical shape.

12. The conical edible container of claim 1, wherein in the third sectional structure, the edible second adhesive layer is positioned to radially overlap an end edge of the inner shell and an end edge of the edible first adhesive layer.

13. The conical edible container of claim 12, wherein the edible second adhesive layer comprises a grain paste, and wherein a total radial thickness of the third sectional structure is greater than a total radial thickness of the first sectional structure, thereby counteracting the elasticity of the inner shell.

14. The conical edible container of claim 13, wherein the edible second adhesive layer is configured such that a bonding force between overlapping portions of the outer shell in the third sectional structure is greater than a bonding force between the inner shell and the outer shell in the first sectional structure.

15. A method for manufacturing a conical edible container, the method comprising:

(a) preparing the outer shell which is edible and an inner shell which is edible;

(b) bonding the outer shell and the inner shell using an edible first adhesive layer provided between the outer shell and the inner shell;

(c) forming a conical shape by winding the outer shell and the inner shell in a state, in which the outer shell and the inner shell are bonded to each other, by an edible second adhesive layer such that the conical shape is not released, and wherein at least a partial area of the conical edible container has a first sectional structure, in which the inner shell, the edible first adhesive layer, and the outer shell are sequentially stacked in a direction that faces an outer side from an inner side, and a second sectional structure, in which the inner shell, the edible first adhesive layer, the outer shell, the edible second adhesive layer, the inner shell, the edible first adhesive layer, and the outer shell are sequentially stacked, and a third sectional structure, in which the inner shell, the edible first adhesive layer, the outer shell, the edible second adhesive layer, and the outer shell are sequentially stacked, and wherein the outer shell is larger than the inner shell so that the entire inner shell is superimposed on the outer shell, and wherein the first sectional structure, the second sectional structure, and the third sectional structure are sequentially arranged along a circumferential direction of the conical edible container, and wherein the edible second adhesive layer is positioned between the outer shell and the inner shell to reinforce bonding therebetween in the second sectional structure, and the edible second adhesive layer is positioned between overlapping portions of the outer shell to bond the outer shell to itself in the third sectional structure, and wherein the edible second adhesive layer is configured to maintain the conical shape by counteracting an elasticity of the inner shell, the elasticity of the inner shell being greater than an elasticity of the outer shell; and (d) baking the conical shape.

* * * * *